US007213087B1

(12) United States Patent
Bertone et al.

(10) Patent No.: US 7,213,087 B1
(45) Date of Patent: May 1, 2007

(54) MECHANISM TO CONTROL THE ALLOCATION OF AN N-SOURCE SHARED BUFFER

(75) Inventors: Michael S. Bertone, Marlborough, MA (US); Richard E. Kessler, Shrewsbury, MA (US); David H. Asher, Sutton, MA (US); Steve Lang, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 634 days.

(21) Appl. No.: 09/651,924

(22) Filed: Aug. 31, 2000

(51) Int. Cl.
*G06F 5/00* (2006.01)

(52) U.S. Cl. .......................... 710/56; 710/53; 709/232; 370/229

(58) Field of Classification Search ............. 709/223, 709/224, 400, 235, 232, 234; 370/235, 258, 370/389, 236, 397, 229, 413, 230, 468; 710/52, 710/110, 58, 317; 718/105
See application file for complete search history.

(56) References Cited

U.S. PATENT DOCUMENTS

| | | | | |
|---|---|---|---|---|
| 5,261,066 A | 11/1993 | Jouppi et al. | ............... | 395/425 |
| 5,317,718 A | 5/1994 | Jouppi | .......................... | 395/425 |
| 5,446,734 A * | 8/1995 | Goldstein | .................. | 370/397 |
| 5,758,183 A | 5/1998 | Scales | ......................... | 395/825 |
| 5,761,729 A | 6/1998 | Scales | ......................... | 711/148 |
| 5,787,480 A | 7/1998 | Scales et al. | .............. | 711/148 |
| 5,802,585 A | 9/1998 | Scales et al. | .............. | 711/154 |
| 5,809,450 A | 9/1998 | Chrysos et al. | ............ | 702/186 |
| 5,875,151 A | 2/1999 | Mick | .......................... | 365/233 |
| 5,890,201 A | 3/1999 | McLellan et al. | ........... | 711/108 |
| 5,893,931 A | 4/1999 | Peng et al. | ................. | 711/206 |
| 5,898,671 A * | 4/1999 | Hunt et al. | ................. | 370/235 |
| 5,918,250 A | 6/1999 | Hammond | ................... | 711/205 |

(Continued)

OTHER PUBLICATIONS

*Are Your PLDs Metastable?*, Cypress Semiconductor Corporation, Mar. 6, 1997 (19 p.).

(Continued)

*Primary Examiner*—Nathan J. Flynn
*Assistant Examiner*—Dustin Nguyen (57) ABSTRACT

A method and apparatus for ensuring fair and efficient use of a shared memory buffer. A preferred embodiment comprises a shared memory buffer in a multi-processor computer system. Memory requests from a local processor are delivered to a local memory controller by a cache control unit and memory requests from other processors are delivered to the memory controller by an interprocessor router. The memory controller allocates the memory requests in a shared buffer using a credit-based allocation scheme. The cache control unit and the interprocessor router are each assigned a number of credits. Each must pay a credit to the memory controller when a request is allocated to the shared buffer. If the number of filled spaces in the shared buffer is below a threshold, the buffer immediately returns the credits to the source from which the credit and memory request arrived. If the number of filled spaces in the shared buffer is above a threshold, the buffer holds the credits and returns the credits in a round-robin manner only when a space in the shared buffer becomes free. The number of credits assigned to each source is sufficient to enable each source to deliver an uninterrupted burst of memory requests to the buffer without having to wait for credits to return from the buffer. The threshold is the point when the number of free spaces available in the buffer is equal to the total number of credits assigned to the cache control unit and the interprocessor router.

22 Claims, 4 Drawing Sheets

U.S. PATENT DOCUMENTS

| | | | |
|---|---|---|---|
| 5,918,251 A | 6/1999 | Yamada et al. ............. | 711/207 |
| 5,923,872 A | 7/1999 | Chrysos et al. ............. | 395/591 |
| 5,950,228 A | 9/1999 | Scales et al. ............... | 711/148 |
| 5,958,019 A * | 9/1999 | Hagersten et al. .......... | 709/400 |
| 5,964,867 A | 10/1999 | Anderson et al. ........... | 712/219 |
| 5,982,771 A * | 11/1999 | Caldara et al. ............. | 370/389 |
| 5,983,325 A | 11/1999 | Lewchuk ..................... | 711/137 |
| 5,999,518 A * | 12/1999 | Nattkemper et al. ........ | 370/258 |
| 6,000,044 A | 12/1999 | Chrysos et al. ............... | 714/47 |
| 6,044,406 A * | 3/2000 | Barkey et al. .............. | 709/235 |
| 6,070,227 A | 5/2000 | Rokicki ....................... | 711/117 |
| 6,078,565 A * | 6/2000 | Ben-Michael et al. ...... | 370/236 |
| 6,085,300 A | 7/2000 | Sunaga et al. ............. | 711/168 |
| 6,104,727 A * | 8/2000 | Moura et al. ............... | 370/468 |
| 6,115,748 A * | 9/2000 | Hauser et al. .............. | 709/234 |
| 6,256,674 B1 * | 7/2001 | Manning et al. ............ | 709/232 |
| 6,347,337 B1 * | 2/2002 | Shah et al. .................. | 709/224 |
| 6,359,884 B1 * | 3/2002 | Vincent ....................... | 370/389 |
| 6,426,957 B1 * | 7/2002 | Hauser et al. .............. | 370/413 |
| 6,452,903 B1 * | 9/2002 | Peck et al. .................. | 370/235 |
| 6,493,776 B1 * | 12/2002 | Courtright et al. .......... | 710/110 |
| 6,515,963 B1 * | 2/2003 | Bechtolsheim et al. ..... | 370/229 |
| 6,532,501 B1 * | 3/2003 | McCracken .................. | 710/52 |
| 6,546,453 B1 | 4/2003 | Kessler et al. | |
| 6,546,465 B1 | 4/2003 | Bertone | |
| 6,567,900 B1 | 5/2003 | Kessler | |
| 6,591,349 B1 | 7/2003 | Steinman et al. | |
| 6,594,701 B1 * | 7/2003 | Forin .......................... | 709/232 |
| 6,601,084 B1 * | 7/2003 | Bhaskaran et al. ......... | 715/105 |
| 6,622,225 B1 | 9/2003 | Kessler et al. | |
| 6,633,960 B1 | 10/2003 | Kessler et al. | |
| 6,636,955 B1 | 10/2003 | Kessler et al. | |
| 6,646,986 B1 * | 11/2003 | Beshai ..................... | 370/230.1 |
| 6,654,858 B1 | 11/2003 | Asher et al. | |
| 6,662,265 B1 | 12/2003 | Kessler et al. | |
| 6,662,319 B1 | 12/2003 | Webb, Jr. et al. | |
| 6,668,335 B1 | 12/2003 | Breach et al. | |
| 6,671,822 B1 | 12/2003 | Asher et al. | |
| 6,674,722 B1 * | 1/2004 | Tiainen et al. .............. | 370/236 |
| 6,678,840 B1 | 1/2004 | Kessler et al. | |
| 6,681,295 B1 | 1/2004 | Root et al. | |
| 6,704,817 B1 | 3/2004 | Steinman et al. | |
| 6,715,008 B2 * | 3/2004 | Shimizu ...................... | 710/56 |
| 6,715,057 B1 | 3/2004 | Kessler et al. | |
| 6,735,174 B1 * | 5/2004 | Hefty et al. ................. | 370/235 |
| 6,738,836 B1 | 5/2004 | Kessler et al. | |
| 6,751,698 B1 * | 6/2004 | Deneroff et al. ............ | 710/317 |
| 6,751,721 B1 | 6/2004 | Webb, Jr. et al. | |
| 6,754,739 B1 | 6/2004 | Kessler et al. | |
| 6,779,142 B1 | 8/2004 | Bhavsar et al. | |
| 6,961,781 B1 | 11/2005 | Mukherjee et al. | |
| 6,992,984 B1 * | 1/2006 | Gu ............................. | 370/235 |
| 7,099,913 B1 | 8/2006 | Bertone et al. | |

OTHER PUBLICATIONS

*End-to-End Fault Containment In Scalable Shared-Memory Multiprocessors*, D. Teodosiu, Jul. 2000 (148 p.).

David H. Asher et al., "A High Performance Way Allocation Strategy For A Multi-Way Associative Cache System," U.S. Appl. No. 09/653,092, Aug. 31, 2000 (39 p.), application now abandoned.

Alpha Architecture Reference Manual, Third Edition, The Alpha Architecture Committee, 1998 (month unknown) Digital Equipment Corporation (21 p.), in particular pp. 3-1 through 3-15.

A Logic Design Structure For LSI Testability, E. B. Eichelberger et al., 1977 (month unknown) IEEE (pp. 462-468).

Direct RDRAM 256/288-Mbit (512Kx16/18x32s), Preliminary Information Document DL0060 Version 1.01, Apr. 2000 (69 p.).

Testability Features of AMD-K6 Microprocessor, R. S. Fetherston et al., Advanced Micro Devices, 1997 (month unknown) (8 P.).

Hardware Fault Containment in Scalable Shared-Memory Multiprocessors, D. Teodosiu et al., Computer Systems Laboratory, Stanford University (12 p.), Jun. 1977.

Cellular Disco: resource management using virtual clusters on shared-memory multiprocessors, K. Govil et al., 1999 (month unknown) ACM 1-58113-140-2/99/0012 (16 p.).

Rambus RIMM Module (with 128/144Mb RDRAMs), Preliminary Information, Document DL0084 Version 1.1, Apr. 2000 (12 p.).

Direct Rambus RIMM Module Specification Version 1.0, Rambus Inc., SL-0006-100 (32 p.), 2000 (month unknown).

* cited by examiner

MECHANISM TO CONTROL THE ALLOCATION OF AN N-SOURCE SHARED BUFFER

CROSS-REFERENCE TO RELATED APPLICATIONS

This application relates to the following commonly assigned applications entitled:

"Apparatus And Method for Interfacing A High Speed Scan-Path With A Slow Speed Tester Equipment," Ser. No. 09/653,642, filed Aug. 31, 2000, now U.S. Pat. No. 6,775, 142 "Priority Rules For Reducing Network Message Routing Latency," Ser. No. 09/652,322, filed Aug. 31, 2000, now U.S. Pat. No. 6,961,781; "Scalable Directory Based Cache Coherence Protocol," Ser. No. 09/652,703, filed Aug. 31, 2000, now U.S. Pat. No. 6,633,960; "Scalable Efficient I/O Port Protocol," Ser. No. 09/652,391, now U.S. Pat. No. 6,738,836, filed Aug. 31, 2000; "Efficient Translation Lookaside Buffer Miss Processing In Computer Systems With A Large Range Of Page Sizes," Ser. No. 09/652,552, filed Aug. 31, 2000, now U.S. Pat. No. 6,715,057; "Fault Containment And Error Recovery Techniques In A Scalable Multiprocessor," Ser. No. 09/651,949, filed Aug. 31, 2000, now U.S. Pat. No. 6,678,890; "Speculative Directory Writes In A Directory Based Cache Coherent Uniform Memory Access Protocol," Ser. No. 09/652,834, filed Aug. 31, 2000, now U.S. Pat. No. 7,099,913; "Special Encoding of Known Bad Data," Ser. No. 09/652,314, filed Aug. 31, 2000, now U.S. Pat. No. 6,662,315; "Broadcast Invalidate Scheme," Ser. No. 09/652,165, filed Aug. 31, 2000, now U.S. Pat. No. 6,751,721; "Mechanism To Track All Open Pages In A DRAM Memory System," Ser. No. 09/652,704, filed Aug. 31, 2000, now U.S. Pat. No. 6,662,265; "Programmable DRAM Address Mapping Mechanism," Ser. No. 09/653, 093, filed Aug. 31, 2000, now U.S. Pat. No. 6,546,453; "Computer Architecture And System For Efficient Management Of Bi-Directional Bus," Ser. No. 09/652,323, filed Aug. 31, 2000, now U.S. Pat. No. 6,704,817; "An Efficient Address Interleaving With Simultaneous Multiple Locality Options," Ser. No. 09/652,452, filed Aug. 31, 2000, now U.S. Pat. No. 5,557,900; "A High Performance Way Allocation Strategy For A Multi-Way Associative Cache System," Ser. No. 09/653,092, filed Aug. 31, 2000, now abandoned; "Method And System For Absorbing Defects In High Performance Microprocessor With A Large N-Way Set Associative Cache," Ser. No. 09/651,948, filed Aug. 31, 2000, now U.S. Pat. No. 6,671,822; "A Method For Reducing Directory Writes And Latency In A High Performance, Directory-Based, Coherency Protocol," Ser. No. 09/652, 324, filed Aug. 31, 2000, now U.S. Pat. No. 6,654,858; "Mechanism To Reorder Memory Read And Write Transactions For Reduced Latency And Increased Bandwidth," Ser. No. 09/653,094, filed Aug. 31, 2000, now U.S. Pat. No. 6,591,349; "System For Minimizing Memory Bank Conflicts In A Computer System," Ser. No. 09/652,325, filed Aug. 31, 2000, now U.S. Pat. No. 6,622,225; "Computer Resource Management And Allocation System," Ser. No. 09/651,945, filed Aug. 31, 2000, now U.S. Pat. No. 6,754, 739; "System for recovery data in a multi-processor system comprising a conduction path for each bit between processors where the paths are grouped into separate bundles and routed along different paths" Ser. No. 09/653,643, filed Aug. 31, 2000, now U.S. Pat. No. 6,668,335; "Fast Lane Prefetching," Ser. No. 09/652,451, filed Aug. 31, 2000, now U.S. Pat. No. 6,681,295; "Mechanism For Synchronizing Multiple Skewed Source-Synchronous Data Channels With Automatic Initialization Feature," Ser. No. 09/652,480, filed Aug. 31, 2000, now U.S. Pat. No. 6,636,955; and "Chaining Directory Reads And Writes To Reduce DRAM Bandwidth In A Directory Based CC-NUMA Protocol," Ser. No. 09/652,315, filed Aug. 31, 2000, now U.S. Pat. No. 6,546, 465, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to the distribution of buffer space between multiple sources. More particularly, the invention relates to a fair and efficient method of controlling allocation of a shared buffer pool.

2. Background of the Invention

In computer systems and networks, buffers are a convenient means of storing commands, requests, and data that are in transit from one location to another. Buffers may be used in a variety of applications. They may be used in network switching devices to temporarily hold data packets while networks congestion subsides or while the switch determines the location to which the data must be forwarded. It is not uncommon for network switches to manage traffic for a plurality of sources. Buffers may also be used in memory and data allocation. An example of the latter would be a data read/write request buffer that must allocate requests from multiple sources. A common problem in systems using a shared buffer space is signal traffic that creates congestion and may lead to buffer overflow and monopolization by one or more of the buffer sources.

Ideally, a system comprising a buffer with multiple sources should accomplish several tasks. First, the system should not deliver data, commands, or requests to the buffer if the buffer does not have any free space. This prevents data loss or packet drops which may require that the data packet be re-sent resulting in even greater bandwidth loss than simply holding the data until buffer space becomes available. Secondly, access to buffer space by the multiple sources should preferably be allocated in a fair manner. The sources should have fair access to the buffer so a source does not become backlogged while other sources are able to deliver data freely. This does not necessarily imply that the allocation needs to be equal for each source. For instance, one source may be given priority over the others. However, even in this scenario, it is important to prevent complete monopolization by the source that has priority.

One conventional solution to the problem of fair allocation of a shared buffer space is hard partitioning of the buffer space. For example, if a buffer has 16 data spaces and the buffer is shared among 4 sources, each source may be allocated four buffer slots. This method of allocation is certainly fair but may be horribly inefficient. If one of the sources has a string of data that ideally could be burst to the buffer, congestion may occur because the source only has four buffer spaces available. The remaining 12 buffers could be used to hold the burst of data, but instead may lie dormant because of the hard partitioning.

If prior knowledge exists about the type of traffic that can be expected from the sources, the hard partitioning may be altered to allocate more buffer space to one source or another. For instance, in the example given above, seven buffer spaces may be allocated to one source while the other three sources are allocated three spaces each. This allocation may alleviate congestion for the prioritized source, but does not prevent the burst congestion for of the other sources. In either case, hard partitioning tends to preclude use of at least a fixed percentage of the buffer space unless all sources are continuously accessing the buffer.

Another conventional solution to the problem of fairly and efficiently allocating buffer space is with stop and go commands issued by the buffer. In this type of system, the buffer is configured to keep track of available spaces within the buffer. During normal operation with light traffic, each source receives a "go" signal from the buffer indicating that buffer space is available. As buffer space becomes limited, the buffer may send "stop" signals to the individual sources to halt data transmission to the buffer. This approach offers better use of the buffer space because the sources are not limited to a fixed percentage of the buffer space. However, some risk is involved in this type of embodiment because a finite time exists between the moment the buffer sends out a stop command and the moment the source receives and responds to the stop command. During this finite time, it is possible for additional data to be transmitted to the buffer from the various sources. If the buffer was sufficiently close to being full and enough data was sent to the buffer before the stop commands were received by the sources, buffer overflow may occur and data may be lost. To prevent this, stop commands are usually sent well in advance of the buffer filling to capacity. Thus, if all buffer sources are bursting data to the buffer, the stop command is preferably timed so that the sources stop sending data to the buffer before the buffer capacity is filled. Unfortunately, the side effect of sending the stop commands early is that the maximum capacity of the buffer will not be used when the buffer sources are not simultaneously sending bursts of data. The stop/go command solution to this buffer allocation problem is an improvement over the hard partitioning solution, but presents problems of either overflow or inefficient use of the whole buffer.

It is desirable therefore to develop a fair and efficient means of allocating buffer space among several sources. The allocation preferably prevents monopolization by any of the buffer sources. The allocation method also preferably takes advantage of the full capacity of the buffer space without the possibility of buffer overflow. The system may advantageously be applied to a plurality of buffer sources and may also be applied to a variety of applications.

BRIEF SUMMARY OF THE INVENTION

The problems noted above are solved in large part by a method and apparatus for ensuring fair and efficient use of a shared memory buffer. The invention uses a credit-based allocation scheme to prevent monopolization by one or more sources and permits efficient use of the entire buffer. A preferred embodiment comprises a shared memory request buffer in a multi-processor computer system. The shared memory request buffer is used to store requests from different processors. Memory requests from a local processor are delivered to the local memory controller by a cache control unit. Requests from other processors are delivered to the memory controller by an interprocessor router. The memory controller allocates the memory requests in a shared buffer using a credit-based allocation scheme. The cache control unit and the interprocessor router are each assigned a number of credits. Each must pay a credit to the memory controller when a request is allocated to the shared buffer. If a source does not have any available credits, that source may not send a request to the shared buffer. The number of credits assigned to each source is sufficient to enable each source to deliver an uninterrupted burst of memory requests to the buffer without having to wait for credits to return from the buffer. The total number of credits assigned to the sources is preferably small compared to the overall size of the buffer. If the number of filled spaces in the shared buffer is below a threshold, the buffer immediately returns the credits to the source from which the credit and memory request arrived. If the number of filled spaces in the shared buffer is above a threshold, the buffer holds the credits and returns a single credit in a round-robin manner only when a space in the shared buffer becomes free. The buffer threshold is the point when the number of free spaces available in the buffer is equal to the total number of credits assigned to the cache control unit and the interprocessor router. Since credits are not freely returned as the buffer gets full and since there are never any more credits available than spaces in the buffer, the buffer may reach capacity, but will not overflow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment of the shared buffer allocation scheme is directed toward application in a memory request buffer used in a multi-processor computer system. While the preferred embodiment may be implemented in a variety of applications, a detailed description in the context of the multi-processor computer system is provided herein. The descriptions herein are not intended to limit the scope of the claim limitations set forth in this specification.

Figure 1:
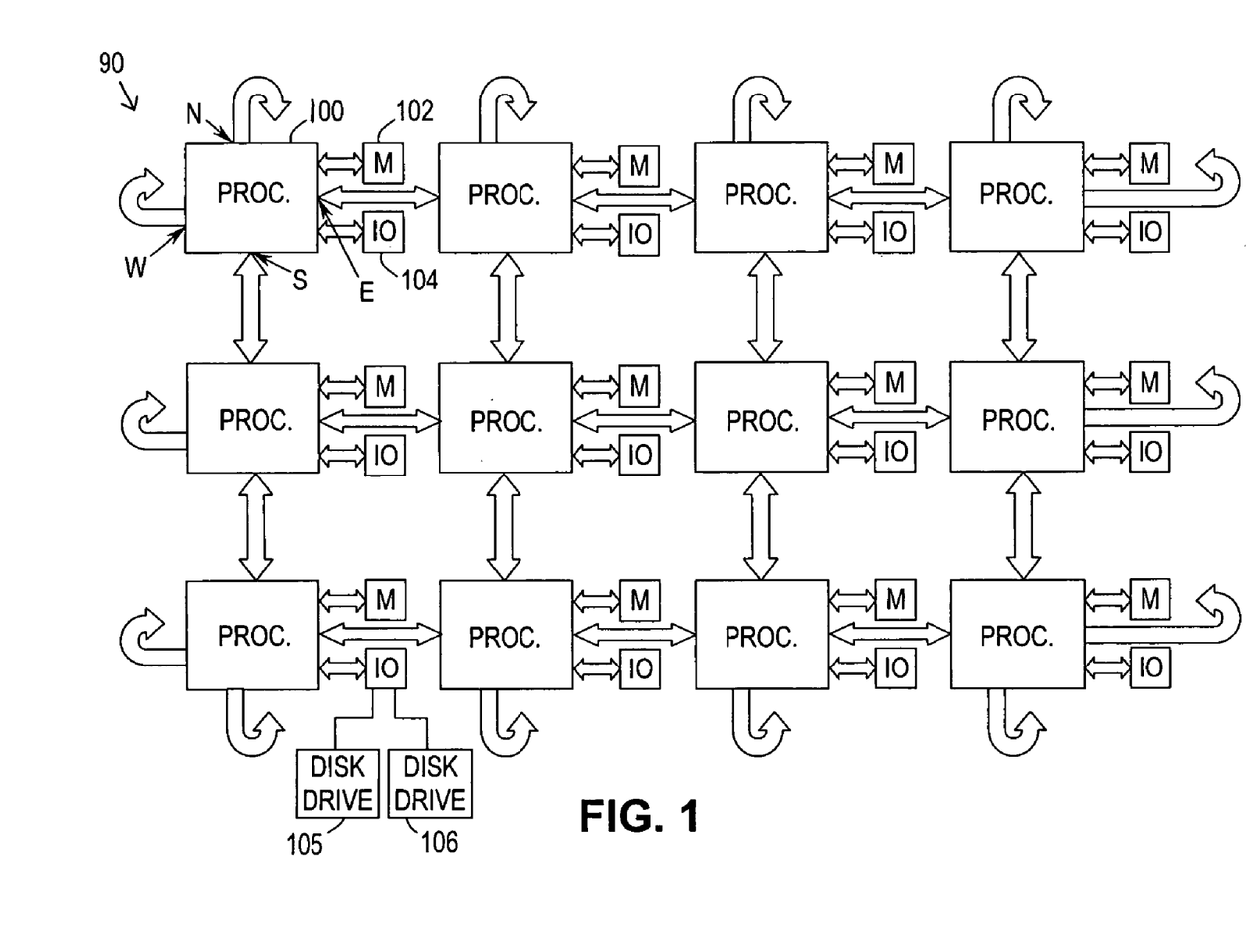
FIG. 1 shows a system diagram of a plurality of microprocessors coupled together.

Referring now to FIG. 1, in accordance with the preferred embodiment of the invention, computer system 90 comprises one or more processors 100 coupled to a memory 102 and an input/output ("I/O") controller 104. As shown, computer system 90 includes twelve processors 100, each processor coupled to a memory and an I/O controller. Each processor preferably includes four ports for connection to adjacent processors. The interprocessor ports are designated "North," "South," "East," and "West" in accordance with the well-known Manhattan grid architecture also known as a crossbar interconnection network architecture. As such, each processor 100 can be connected to four other processors. The processors on both ends of the system layout wrap around and connect to processors on the opposite side to implement a 2D torus-type connection. Although twelve processors 100 are shown in the exemplary embodiment of FIG. 1, any desired number of processors (e.g., 256) can be included. For purposes of the following discussion, the processor in the upper, left-hand corner of FIG. 1 will be discussed with the understanding that the other processors 100 are similarly configured in the preferred embodiment.

As noted, each processor preferably has an associated I/O controller 104. The I/O controller 104 provides an interface to various input/output devices such as disk drives 105 and 106, as shown in the lower, left-hand corner of FIG. 1. Data from the I/O devices thus enters the 2D torus via the I/O controllers.

Each processor also, preferably, has an associated memory 102. In accordance with the preferred embodiment, the memory 102 preferably comprises RAMbus™ memory devices, but other types of memory devices can be used, if desired. The capacity of the memory devices 102 can be any suitable size. Further, memory devices 102 preferably are implemented as Rambus Interface Memory Modules ("RIMM"). To aid in the control of distributed memory in the multiprocessor system, each processor includes a memory manager and directory structure for the local memory source. A preferred embodiment of the memory controller is shown in FIG. 2.

In general, computer system 90 can be configured so that any processor 100 can access its own memory 102 and I/O devices, as well as the memory and I/O devices of all other processors in the system. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through prcoessors.

Figure 2:
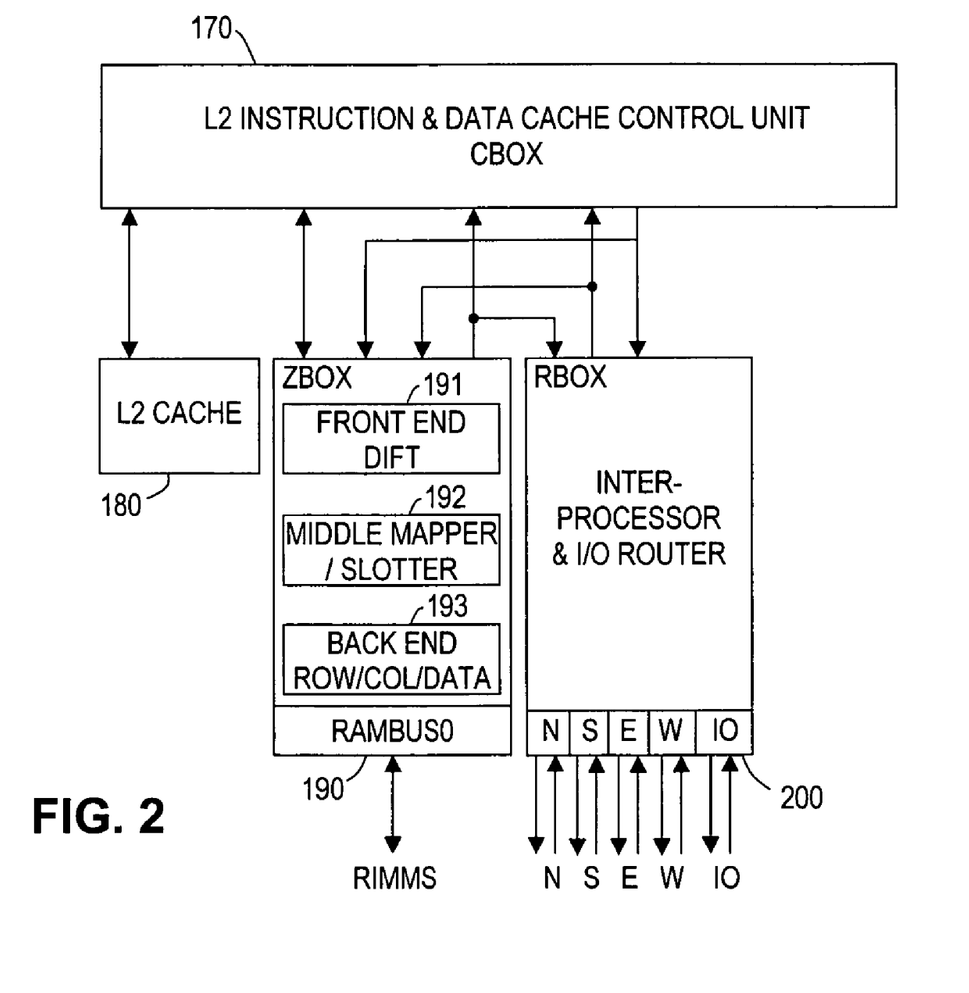
FIG. 2 shows a block diagram of a microprocessor memory controller in which the preferred embodiment is implemented.

Referring now to FIG. 2, each processor 100 preferably includes an L2 instruction and data cache control unit ("Cbox") 170, an L2 data cache 180, a memory controller ("Zbox") 190, and an interprocessor and I/O router unit ("Rbox") 200. The following discussion describes each of these units.

Each of the functional units 170, 180, 190, 200 contains control logic that communicates with the control logic of other functional units as shown. Other functional units may exist within the processor 100, but have been omitted from FIG. 1 for clarity in the description of the preferred embodiment. For example, the processor may further comprise integer and floating-point execution units, a memory reference unit, and an instruction fetch, issue and retire unit.

The L2 instruction and data cache control unit ("Cbox") 170 controls the L2 instruction and data cache 180 and handles data accesses from other functional units in the processor, other processors in the computer system, or any other devices that might need data out of the L2 cache.

The interprocessor and I/O router unit ("Rbox") 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

Processor 100 preferably includes at least one RAMbus™ memory controller 190 ("Zobx"). The Zbox 190 controls 4 or 5 channels of information flow with the main memory 102 (FIG. 1). The Zbox 190 preferably includes a back end 193, a middle mapper 192, and a front-end directory in flight table ("DIFT") 191. The middle mapper 192 maps the physical address into RAMbus™ device format by device, bank, row, and column. The middle mapper 192 also maintains an open-page table to track all open pages and to close pages on demand if bank conflicts arise. The mapper 192 also schedules RAMbus™ transactions such as timer-base request queues. The Zbox back end 193 preferably packetizes the address, control, and data into RAMbus™ format and provides the electrical interface to the RAMbus™ devices themselves.

The front-end DIFT 191 performs a number of functions such as managing the processor's directory-based memory coherency protocol, processing request commands from the Cbox 170 and Rbox 200, sending forward commands to the Rbox 200, sending response commands to and receiving packets from the Cbox 170 and Rbox 200.

The DIFT 191 also comprises a shared request buffer for tracking up to thirty-two in-flight transactions. These transaction requests or packets are received from the Cbox 170 or the Rbox 200. When a request comes from either source, the DIFT must allocate an entry in the 32-space buffer. The requests from the Cbox 170 are from the local processor chip whereas requests from the Rbox 200 are off chip requests. Since each processor in the multi-processor system shown in FIG. 1 is identical, a Cbox 170 request should carry the same priority as a request from the Rbox 200. It is important therefore to allocate space in the shared DIFT buffer in a fair and efficient manner.

Figure 3:
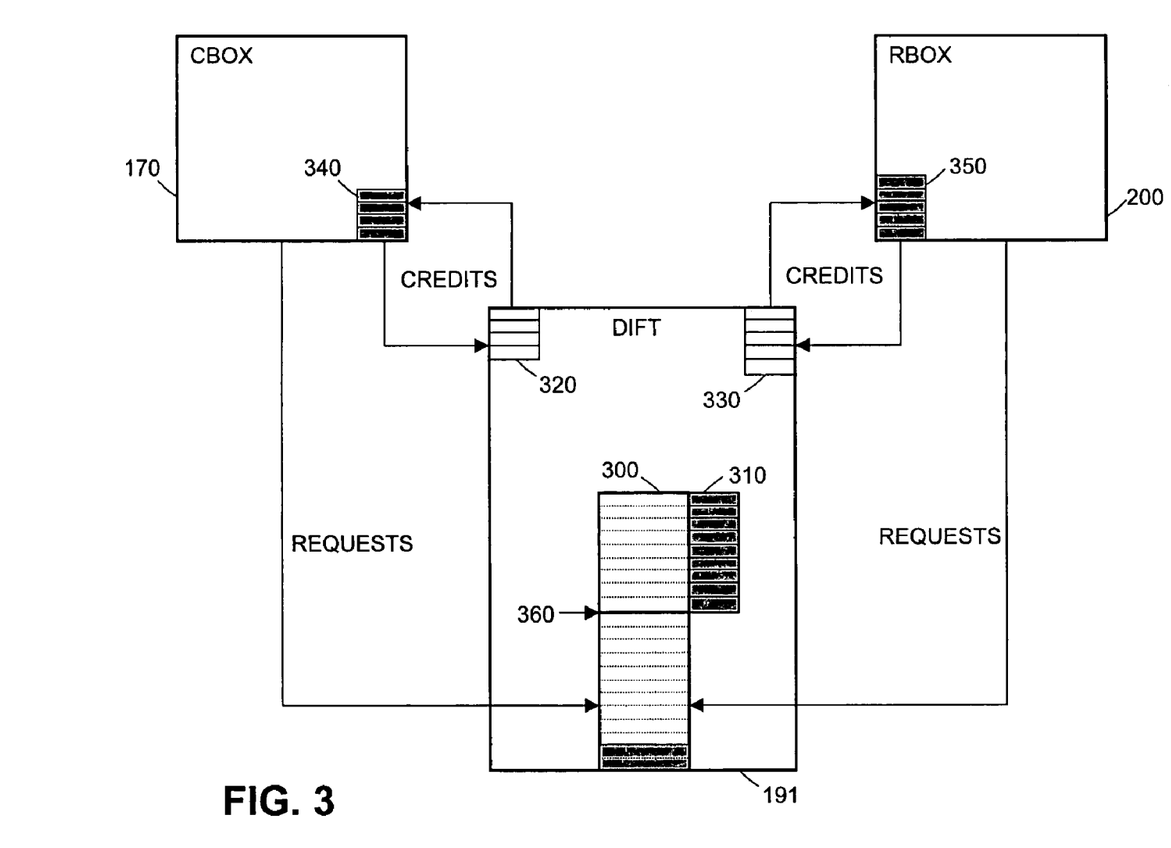
FIG. 3 shows a schematic representation of the credit-based allocation of the memory request buffer in the memory controller of FIG. 2 operating in a light load condition.

FIG. 3 represents a simplified schematic of the preferred embodiment of a credit allocation scheme for the DIFT buffer. The DIFT 191 preferably includes a shared request buffer 300 and credit counters 310, 320, 330. The Cbox 170 preferably includes a credit counter 340. Likewise, the Rbox includes a credit counter 350. The credit counters in the DIFT 191, Cbox 170 and Rbox 200 determine when the Cbox 170 and Rbox 200 may deliver a request to the DIFT 191. For both the Cbox 170 and Rbox 200, a request may only be delivered to the DIFT 191 when a credit is available in the local credit counter 340 and 350, respectively. A credit from Cbox counter 340 is spent (i.e., given up to the DIFT credit counter 320) by the Cbox 170 when a request is sent to the DIFT buffer 300. Similarly, a credit from Rbox counter 350 is spent (i.e., given up to the DIFT credit counter 330) by the Rbox 200 when a request is sent to the DIFT buffer 300.

In the preferred embodiment, credits are returned from the DIFT 191 to the Cbox 170 and Rbox 200 in two distinct manners. The method of returning credits depends on the region of operation for the DIFT buffer 300. The first occurs under light loads when the DIFT buffer 300 is relatively empty. This condition is met when the number of occupied buffer spaces is below a threshold 360. In the example shown in FIG. 3, the DIFT buffer 300 only has a few buffer spaces filled. In this situation, the DIFT 191 immediately returns credits to the source from which a request arrives.

The Cbox 170 and Rbox 200 will therefore have all or nearly all of their credits in light load conditions.

The number of credits assigned to the Cbox 170 and Rbox 200 are based, in part, on credit round trip times. Since credits are returned immediately during light load situations, the total time required to transmit a credit from the Cbox 170 to the DIFT 191 and for the DIFT 191 to return the credit to the Cbox 170 may be determined. The number of credits given to the Cbox 170 is based not only on this round trip time, but also on the speed with which the Cbox 170 may deliver a burst of requests. The preferred embodiment gives enough credits so that if the Cbox 170 has enough memory requests from the processor, it may continuously deliver these requests without having to wait for credits to return from the DIFT 191. Consider for example that the Cbox 170 has a string of requests that need to be sent yet only has 4 credits. Ideally if the Cbox bursts these requests one after another as quickly as it can, then by the time the Cbox is ready to transmit the fifth request, the credit from the first request has preferably arrived back at the Cbox 170. This credit may then be used to transmit the fifth request. Subsequent requests may then be transmitted with other credits as they arrive back at the Cbox 170. This process may continue as long as the number of occupied spaces in the DIFT buffer remains under the threshold 360.

The number of credits given to the Rbox 200 is determined in the same way as for the Cbox 170. The round trip times between the two sources should not be assumed to be the same. A source with longer credit round trip times will necessarily require more credits to guarantee uninterrupted burst requests. Thus the number of credits assigned to the Rbox 200 will probably, though not necessarily, differ from the number of credits given to the Cbox 170. In the system shown in FIG. 3, the Cbox counter 340 holds four credits while the Rbox counter 350 holds five credits. The actual number of credits given to each source in the preferred embodiment is system specific and will depend on round trip times between source and buffer.

The second manner in which the DIFT 191 returns credits to the Cbox 170 and Rbox 200 occurs under heavier loads when the DIFT buffer 300 is relatively full. The threshold 360 between these two conditions is preferably defined as the difference between the size of the DIFT buffer 300 and the number of credits distributed among the sources. In the system shown in FIG. 3, the threshold occurs when there are only nine buffer spaces left. When the DIFT buffer 300 is filled above this threshold, the DIFT 191 will hold credits until a buffer space is freed. This situation is depicted in FIG. 4.

Figure 4:
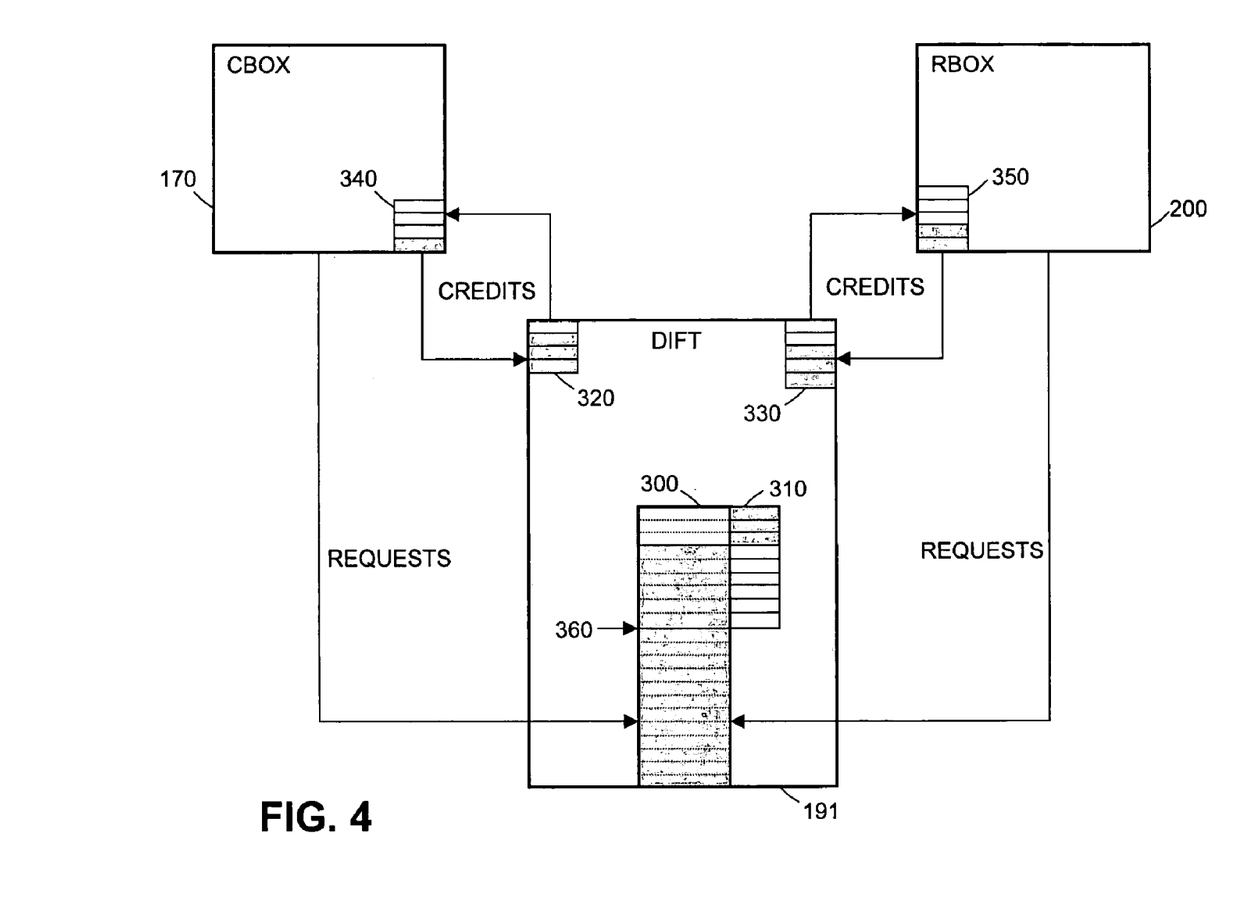
FIG. 4 shows the memory request buffer of FIG. 3 operating in a heavy load condition.

In FIG. 4, the DIFT buffer 300 is filled above the threshold 360 and therefore, the DIFT 191 holds onto the credits by the Cbox 170 and Rbox 200. The credits held from the Cbox 170 and Rbox 200 are stored in counters 320 and 330, respectively. In this region of operation, the DIFT buffer counter 310 indicates the number of DIFT buffer spaces available. The threshold 360 is set so that the number of outstanding credits never exceeds the number of free spaces in the DIFT buffer 300. Thus, if the Cbox 170 and Rbox 200 send requests until all credits are gone, the DIFT buffer will be full. The preferred embodiment may therefore advantageously use the entire DIFT buffer 300 without running the risk of buffer overflow.

In the second region of operation, each time a space in the DIFT buffer 300 becomes available, credits are preferably returned to the Cbox 170 or Rbox 200. To ensure fairness, the credits are returned in a random, equally probable round-robin fashion to those sources which have spent credits. A suitable method of returning the credits may be to simply alternate credit returns. Other embodiments exist where statistical methods are used to determine which source receives a credit. For instance, if priority needs to be given to the Cbox 170, the credit returns may be based on a random generator that is statistically skewed to return more credits to the Cbox 170 than the Rbox 200. The preferred embodiment however, returns credits on an equally likely basis to ensure fairness between the sources. It should also be noted that when the system operates in the first region of operation (during light loads), fairness between the sources is guaranteed because credits are returned immediately.

An alternative embodiment exists whereby the credit allocation scheme may be used to send request or response commands to the DIFT buffer 300. In this embodiment, the Cbox 170 and Rbox 200 are assigned credits as discussed above, but each must reserve a final credit for a response only. Thus, all credits in the Cbox 170 or Rbox 200 may be spent in issuing requests or responses to the DIFT buffer 300, but the last credit must be spent on a response.

The above discussion is meant to be illustrative of the principles and various embodiments of the present invention. Numerous variations and modifications will become apparent to those skilled in the art once the above disclosure is fully appreciated. For example, the shared buffer space may be extended to include three or more buffer sources. It is intended that the following claims be interpreted to embrace all such variations and modifications.

What is claimed is:

1. A multi-processor computer system, comprising:
   a plurality of processors, each processor coupled to at least one memory cache, one cache control unit, and one interprocessor router; and
   a memory coupled to each processor, each memory managed by a memory controller configured to accept memory requests from the plurality of processors;
   wherein the memory requests from a local processor are delivered to the memory controller by the cache control unit and wherein memory requests from other processors are delivered to the memory controller by the interprocessor router and wherein the memory controller allocates the memory requests from the plurality of processors in a shared buffer using a credit-based allocation scheme in which the memory controller automatically returns a credit if a number of filled spaces in the shared buffer is below a threshold, and returns credits in a round-robin manner if a number of filled spaces in the shared buffer exceeds the threshold,
   wherein a number of credits assigned to the interprocessor router and the cache control unit is based, at least in part, on round-trip times required to transmit credits between the interprocessor router and the buffer and between the cache control unit and the buffer.

2. The computer system of claim 1 wherein:
   the cache control unit and the interprocessor router are each assigned a number of credits;
   at least one of said credits must be delivered by the cache control unit to the memory controller when a memory request is delivered by the cache control unit to the memory controller; and
   at least one of said credits must be delivered by the interprocessor router to the memory controller when a memory request is delivered by the interprocessor router to the memory controller;

wherein if the number of filled spaces in the shared buffer is below the threshold, the buffer returns the credits to the source from which the credit and memory request arrived.

3. The multi-processor computer system of claim 2 wherein:
wherein if the number of filled spaces in the shared buffer is above the threshold, the buffer holds the credits and returns a credit in a round-robin manner to a source from which a credit has been received only when a space in the shared buffer becomes free; and
wherein if a source has no available credits, that source cannot deliver a memory request to the shared buffer.

4. The multi-processor computer system of claim 2 wherein:
the number of credits assigned to the cache control unit and the interprocessor router is sufficient to enable each source to deliver an uninterrupted burst of memory requests to the buffer without having to wait for credits to return from the buffer.

5. The multi-processor computer system of claim 4 wherein:
the number of credits available in the cache control unit and the interprocessor router are stored and updated in counters located in the cache control unit and the interprocessor router; and
the number of credits spent by the cache control unit and the interprocessor router are stored and updated in counters located in the shared buffer.

6. The multi-processor computer system of claim 4 wherein:
the threshold is the point when the number of free spaces available in the buffer is equal to the total number of credits assigned to the cache control unit and the interprocessor router.

7. A computer processor for use in a multi-processor system, comprising:
an associated memory;
a memory controller comprising a request buffer in a front-end directory in-flight table;
an L2 data cache;
an L2 instruction and data cache control unit configured to send request and response commands from the processor to the memory controller; and
an interprocessor and I/O router unit configured to send request and response commands from remote processors to the memory controller;
wherein the L2 instruction and data cache control unit and interprocessor and I/O router unit are assigned a number of credits to be used by said processor and said remote processors and are configured to give up a credit to the directory in-flight table each time a request or response command is sent to the request buffer and wherein if the request buffer is filled below a buffer threshold, the directory in-flight table immediately returns credits to the source from which the credit was received, and if the request buffer is filled above the buffer threshold, the directory in-flight table holds on to a credit and returns said credit upon an entry in the request buffer becoming free,
wherein if a source has no available credits, the source does not send request or response commands to the request buffer and wherein if the source has one available credit, the source reserves the one available credit to send a response command to the request buffer.

8. The computer processor of claim 7 wherein:
the credits are returned to the sources which have given up credits to the directory in-flight table in a random, equally probably manner.

9. The computer processor of claim 7 wherein:
the buffer threshold is the point above which the number of empty spaces in the request buffer is equal to the total number of credits assigned to the L2 instruction and data cache control unit and interprocessor and I/O router.

10. The computer processor of claim 7 wherein the directory in-flight table further comprises:
a counter to store and update the number of credits spent by the L2 instruction and data cache control unit;
a counter to store and update the number of credits spent by the interprocessor and I/O router; and
a counter to store and update the number of empty spaces in the request buffer when the request buffer is filled above the buffer threshold;
wherein when the request buffer is filled above the buffer threshold, the directory in-flight table holds credits and returns credits only when the number of empty spaces in the buffer increases.

11. The computer processor of claim 7 wherein:
the number of credits available to the L2 instruction and data cache control unit and interprocessor and I/O router is stored and updated by counters in each unit.

12. The computer processor of claim 7 wherein:
the number of credits available to the L2 instruction and data cache control unit and interprocessor and I/O router is determined by the round trip time required to send a credit to and receive a credit from the directory in-flight table;
wherein the number of credits given to each source is sufficient to allow each source to send an uninterrupted sequence of request or response commands to the directory in-flight table without delays caused by waiting for credits to return from the directory in-flight table.

13. A method of allocating space in a shared buffer, comprising:
assigning credits to each of a plurality of sources that sends data packets to the shared buffer; and
requiring each source to spend a credit each time that source sends a data packet to the shared buffer;
wherein if the number of empty buffer spaces is larger than a buffer threshold, automatically paying the credit back to the source from which the credit and data were sent; and
wherein if the number of empty buffer spaces is smaller than the buffer threshold, holding the credit until a buffer space becomes empty and then paying a credit back to a source from which a credit was sent,
wherein when the number of empty buffer spaces is smaller than the buffer threshold and a buffer space becomes empty, automatically returning a credit in a random manner to one of the sources that have spent credits held by the buffer.

14. The method of claim 13, wherein:
when the number of empty buffer spaces is smaller than the buffer threshold and a buffer space becomes empty, automatically returning a credit in a random, statistically skewed manner to one of the sources which have spend credits held by the buffer.

15. The method of claim 13, further comprising:
assigning a minimum number of credits to each source that is sufficient to allow each source to send a continuous sequence of data packets without waiting for returned credits.

16. The method of claim 13, further comprising:
preventing a source from delivering a data packet to the shared buffer if that source has no available credits.

17. The method of claim 13, further comprising:
setting the buffer threshold equal to the number of total credits assigned to all the sources.

18. The method of claim 13, further comprising:
using a counter in each source and a counter for each source coupled to the buffer to track spent and paid back credits.

19. A system, comprising:
a plurality of processors;
a receiver;
a buffer accessible to said receiver;
wherein said receiver receives requests from said processors, the receiver comprising a controller that permits said processors to provide memory requests to said buffer based on credits issued by said receiver to said processors and said receiver automatically issues a credit to a processor if a number of filled spaces in said buffer is less than a threshold and holds on to a credit if the number of filled spaces is greater than the threshold,
wherein a total number of issued credits to the plurality of processors does not exceed available space in the buffer so the buffer cannot overflow, and when the number of filled spaces in the buffer exceeds the threshold, then returning credits to the processors in a round-robin manner as space in the buffer becomes free.

20. The system of claim 19 wherein each credit corresponds to a single memory request.

21. The system of claim 19 wherein the receiver further comprises a buffer adapted to receive a plurality of memory requests from said processors, and said credits are automatically issued to said processors to permit said processors to provide said requests to said buffer.

22. The system of claim 19 wherein the receiver issues credits among said processors to avoid a processor from having exclusive access to said receiver to the exclusion of the other processors.

* * * * *

UNITED STATES PATENT AND TRADEMARK OFFICE
CERTIFICATE OF CORRECTION

| | | |
|---|---|---|
| PATENT NO. | : 7,213,087 B1 | Page 1 of 1 |
| APPLICATION NO. | : 09/651924 | |
| DATED | : May 1, 2007 | |
| INVENTOR(S) | : Michael S. Bertone et al. | |

It is certified that error appears in the above-identified patent and that said Letters Patent is hereby corrected as shown below:

In column 1, line 26, delete "Uniform" and insert -- Nonuniform --, therefor.

In column 3, line 41, after "allocation" insert -- scheme --.

In column 5, line 48, delete "prcoessors" and insert -- processors --, therefor.

In column 6, line 8, delete "("Zobx")" and insert -- ("Zbox") --, therefor.

In column 7, line 51, after "credits" insert -- spent --.

In column 7, line 63, after "In" delete "the" and insert -- this --, therefor.

In column 10, line 67, in Claim 14, delete "spend" and insert -- spent --, therefor.

Signed and Sealed this

Twenty-sixth Day of August, 2008

JON W. DUDAS
*Director of the United States Patent and Trademark Office*